(12) United States Patent
Huang et al.

(10) Patent No.: US 10,017,922 B2
(45) Date of Patent: Jul. 10, 2018

(54) HYDRANT DEVICE WITH VACUUM BREAKING FUNCTION

(71) Applicants: Chung-Yi Huang, Lukang Township, Changhua County (TW); Hsiang-Chien Huang, Lukang Township, Changhua County (TW)

(72) Inventors: Chung-Yi Huang, Lukang Township, Changhua County (TW); Hsiang-Chien Huang, Lukang Township, Changhua County (TW)

( * ) Notice: Subject to any disclaimer, the term of this patent is extended or adjusted under 35 U.S.C. 154(b) by 81 days.

(21) Appl. No.: 15/334,325

(22) Filed: Oct. 26, 2016

(65) Prior Publication Data

US 2018/0112377 A1    Apr. 26, 2018

(51) Int. Cl.
*E03B 9/02* (2006.01)
*F16K 27/00* (2006.01)

(52) U.S. Cl.
CPC ............ *E03B 9/027* (2013.01); *F16K 27/006* (2013.01)

(58) Field of Classification Search
CPC ........... E03B 9/027; E03B 7/10; F16K 27/006
USPC ...................................................... 137/512.3
See application file for complete search history.

(56) References Cited

U.S. PATENT DOCUMENTS

| 3,943,963 | A  | * | 3/1976  | Papacek | E03B 9/02  |
|           |    |   |         |         | 137/283    |
| 6,532,986 | B1 | * | 3/2003  | Dickey  | E03B 7/10  |
|           |    |   |         |         | 137/218    |
| 2007/0018130 | A1 | * | 1/2007 | Wu | E03B 7/10 |
|           |    |   |         |         | 251/208    |
| 2013/0312845 | A1 | * | 11/2013 | Wu | E03B 9/027 |
|           |    |   |         |         | 137/218    |

* cited by examiner

*Primary Examiner* — Kevin Lee
*Assistant Examiner* — P. Macade Nichols
(74) *Attorney, Agent, or Firm* — Alan D. Kamrath; Kamrath IP Lawfirm, P.A.

(57) ABSTRACT

A hydrant device includes a faucet body, a rotation shaft, an upper rotation cap, a check valve, a switch valve, a lower fixed cap, and a water intake seat. The faucet body is provided with a rotary knob connected with the rotation shaft which is connected with the upper rotation cap. A first elastic member is biased between the rotation shaft and the upper rotation cap. A second elastic member is biased between the upper rotation cap and the check valve. The check valve is provided with a stop face. The switch valve is combined with the upper rotation cap. The water intake seat is mounted on the faucet body. Thus, the stop face forms an anti-reverse state to seal the switch valve, thereby preventing water from being gathered in the switch valve.

9 Claims, 9 Drawing Sheets

B - B

E - E

HYDRANT DEVICE WITH VACUUM BREAKING FUNCTION

BACKGROUND OF THE INVENTION

1. Field of the Invention

The present invention relates to a hydrant device and, more particularly, to a hydrant device with a vacuum breaking function.

2. Description of the Related Art

A conventional hydrant comprises a switch valve which is made of ceramic material. When in use, the switch valve is closed by a pressing force that is produced by rotation of a screw. However, the conventional hydrant is not provided with an anti-reverse device above the switch valve, so that when the switch valve is closed to stop the water input, residual water easily gathers in the switch valve, thereby rendering growth of bacteria, and thereby causing a pollution. In addition, when the water stops entering the hydrant, the residual water still remains and accumulates in the switch valve so that the residual water easily freezes when the temperature is too low in the winter and will expand to press the switch valve. Thus, the switch valve is easily swollen and broken when the water freezes in the winter.

BRIEF SUMMARY OF THE INVENTION

In accordance with the present invention, there is provided a hydrant device comprising a faucet body, a rotation shaft, an upper rotation cap, a first elastic member, a second elastic member, a check valve, a switch valve, a lower fixed cap, and a water intake seat. The faucet body has an upper end provided with a rotary knob and two water outlet connectors. The faucet body has an interior which receives the rotation shaft, the first elastic member, the upper rotation cap, the second elastic member, the check valve, the switch valve and the lower fixed cap. The rotation shaft extends through the faucet body and has an upper end affixed to the rotary knob to rotate in concert with the rotary knob. The rotation shaft has a lower end provided with an axial hole, a connecting head, a mounting portion and a flange. The upper rotation cap is mounted on the rotation shaft to rotate in concert with the rotation shaft. The upper rotation cap has a central portion provided with a connecting hole mounted on the connecting head of the rotation shaft. The upper rotation cap has a surface provided with a plurality of first water outlet holes. The upper rotation cap has a periphery provided with a plurality of limit arms. The upper rotation cap has a bottom provided with a plurality of inserts. The first elastic member is mounted on the mounting portion of the rotation shaft and is biased between the flange of the rotation shaft and the upper rotation cap. The second elastic member is received in the upper rotation cap and is biased between the upper rotation cap and the check valve. The check valve extends through the second elastic member and extends into the axial hole of the rotation shaft. The check valve has a lower end provided with a stop face. The switch valve is combined with the upper rotation cap to rotate in concert with the upper rotation cap. The switch valve has a conic upper cap having a surface provided with a plurality of second water outlet holes located under the stop face of the check valve. The switch valve has a top provided with a plurality of slots mounted on the inserts of the upper rotation cap. The lower fixed cap has an interior receiving the switch valve. The lower fixed cap has a periphery provided with a plurality of fixed wings. The lower fixed cap has a conic lower cap having a surface provided with a plurality of third water outlet holes corresponding to the second water outlet holes of the switch valve. The conic lower cap and the upper rotation cap form a ball valve. The switch valve is rotatable relative to the lower fixed cap to align or misalign the second water outlet holes of the switch valve with the third water outlet holes of the lower fixed cap. The water intake seat is mounted on a lower end of the faucet body. The water intake seat has an interior provided with a plurality of fourth water outlet holes corresponding to the third water outlet holes of the lower fixed cap, and provided with a cavity for receiving the lower fixed cap. The water intake seat has an upper end provided with a driving portion which has a top provided with a plurality of positioning protrusions and a plurality of positioning recesses arranged between the positioning protrusions. The fixed wings of the lower fixed cap are secured in the positioning recesses of the water intake seat. The limit arms of the upper rotation cap are movable in the positioning recesses of the water intake seat and are limited by the positioning protrusions of the water intake seat.

According to the primary advantage of the present invention, the stop face of the check valve forms an anti-reverse state to seal the switch valve, thereby preventing the water from being gathered in the switch valve.

According to another advantage of the present invention, the stop face of the check valve prevents the water from being collected in the switch valve, so that the switch valve will not be swollen or broken during the winter when the water freezes.

According to a further advantage of the present invention, the stop face of the check valve prevents the water from being accumulated in the switch valve, thereby preventing from growth of bacteria, and thereby preventing from causing a pollution.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
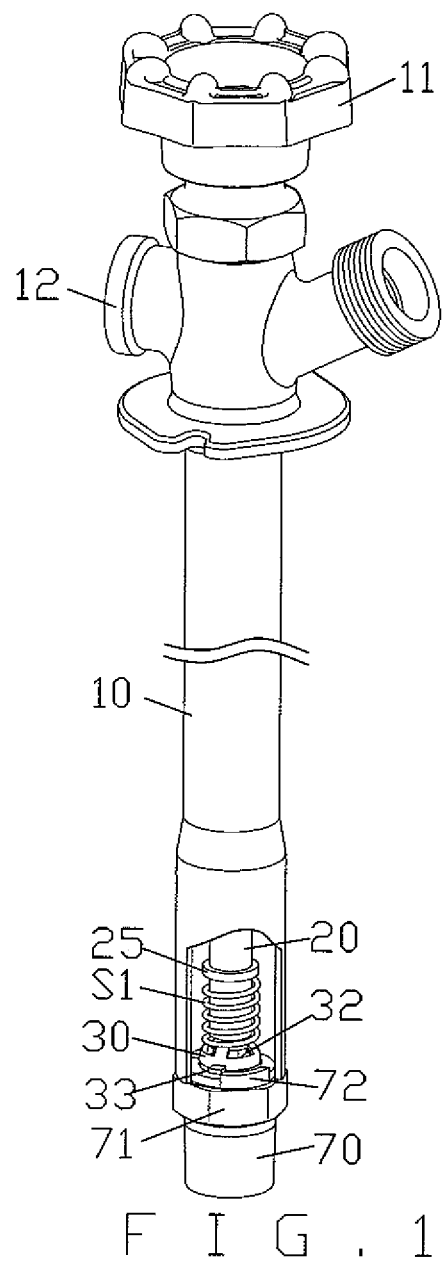
FIG. 1 is a perspective view of a hydrant device in accordance with the preferred embodiment of the present invention.
Figure 2:
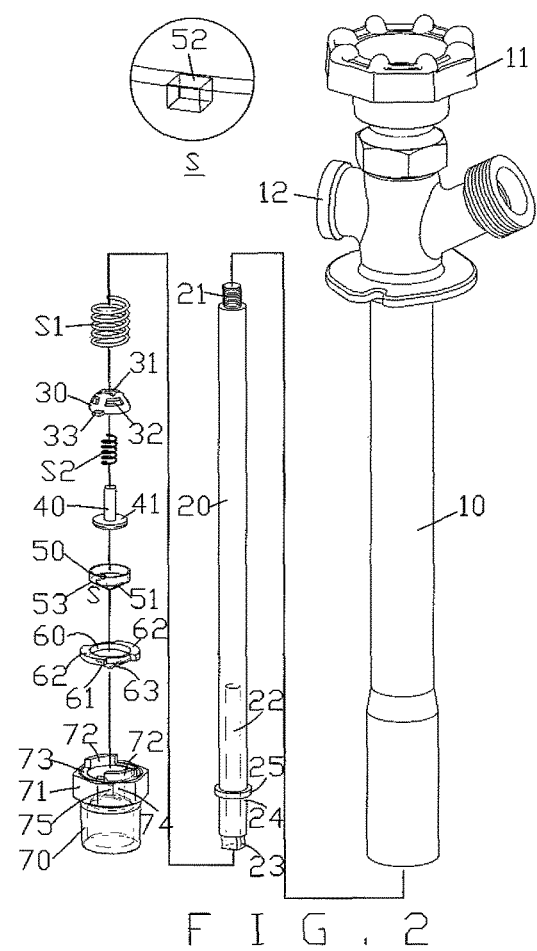
FIG. 2 is an exploded perspective view and an enlarged view taken along mark "S" of the hydrant device in accordance with the preferred embodiment of the present invention.
Figure 3:
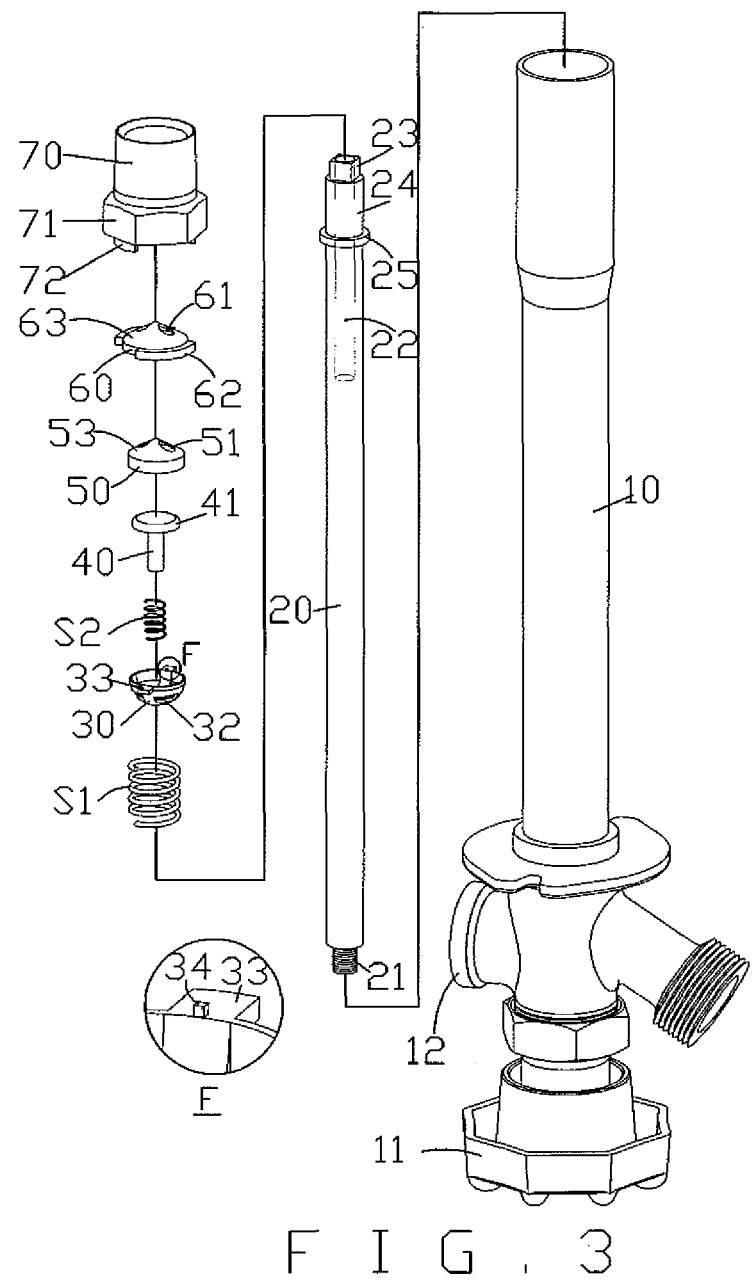
FIG. 3 is an exploded perspective view and an enlarged view taken along mark "F" of the hydrant device in accordance with the preferred embodiment of the present invention.
Figure 4:
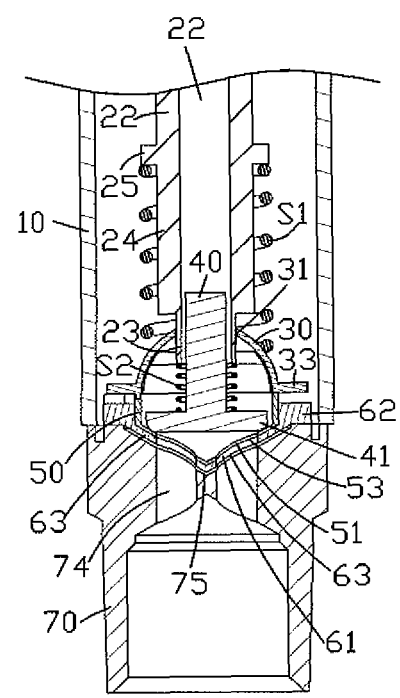
FIG. 4 is a locally enlarged cross-sectional view of the hydrant device as shown in FIG. 1.

Referring to the drawings and initially to FIGS. 1-6, a hydrant device in accordance with the preferred embodiment of the present invention comprises a faucet body 10, a rotation shaft 20, an upper rotation cap 30, a first elastic member "S1", a second elastic member "S2", a check valve 40, a switch valve 50, a lower fixed cap 60, and a water intake seat 70.

Figure 6:
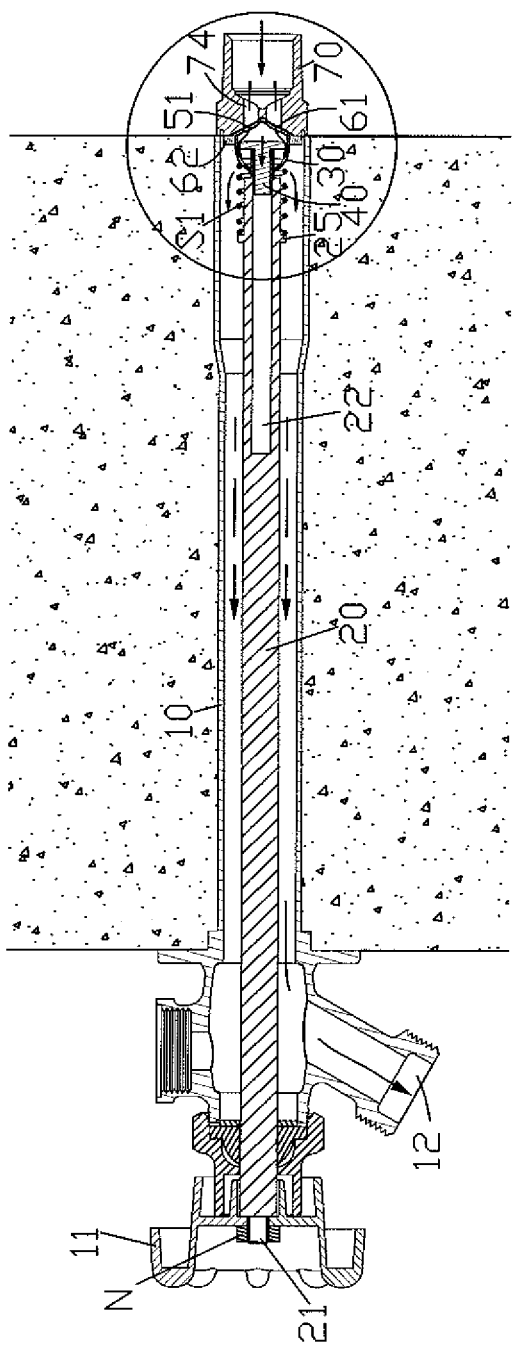
FIG. 6 is a cross-sectional operational view, showing the hydrant device being disposed at an opened state.

The faucet body 10 has an upper end provided with a rotary knob 11 and two water outlet connectors 12. The faucet body 10 is embedded and located under the ground, with the upper end of the faucet body 10 protruding outward from the ground as shown in FIG. 6. The faucet body 10 is a hollow tube and has an interior which receives the rotation shaft 20, the first elastic member "S1", the upper rotation cap 30, the second elastic member "S2", the check valve 40, the switch valve 50 and the lower fixed cap 60.

The rotation shaft 20 extends through the faucet body 10 and has an upper end affixed to the rotary knob 11 of the faucet body 10 to rotate in concert with the rotary knob 11. The rotation shaft 20 has an outer diameter smaller than an inner diameter of the faucet body 10 to define a water flow channel in the interior of the faucet body 10. The rotation shaft 20 has a lower end provided with an axial hole 22, a connecting head 23, a mounting portion 24 and a flange 25. The flange 25 is located above the mounting portion 24 which is located above the connecting head 23.

The upper rotation cap 30 is mounted on the rotation shaft 20 to rotate in concert with the rotation shaft 20. The upper rotation cap 30 has a semi-spherical shape with an opening facing downward. The upper rotation cap 30 has a central portion provided with a connecting hole 31 mounted on the connecting head 23 of the rotation shaft 20. The connecting hole 31 of the upper rotation cap 30 has a shape the same as that of the connecting head 23 of the rotation shaft 20. The upper rotation cap 30 has a surface provided with a plurality of first water outlet holes 32. The upper rotation cap 30 has a periphery provided with a plurality of limit arms 33 extending outward. The upper rotation cap 30 has a bottom provided with a plurality of inserts 34.

The first elastic member "S1" is mounted on the mounting portion 24 of the rotation shaft 20 and is biased between the flange 25 of the rotation shaft 20 and the upper rotation cap 30 to provide a water stop function. The second elastic member "S2" is received in the upper rotation cap 30 and is biased between the upper rotation cap 30 and the check valve 40.

The check valve 40 extends through the second elastic member "S2" and extends into the axial hole 22 of the rotation shaft 20. The check valve 40 has a lower end provided with a stop face 41 having an enlarged diameter.

The switch valve 50 is combined with the upper rotation cap 30 to rotate in concert with the upper rotation cap 30. The switch valve 50 has a conic upper cap 53 with an opening facing upward. The conic upper cap 53 has a surface provided with a plurality of second water outlet holes 51 located under the stop face 41 of the check valve 40. The switch valve 50 has a top provided with a plurality of slots 52 mounted on the inserts 34 of the upper rotation cap 30 so that the switch valve 50 is combined with the upper rotation cap 30.

The lower fixed cap 60 has an interior receiving the switch valve 50. The lower fixed cap 60 has a conic lower cap 63 with an opening facing upward. The conic lower cap 63 and the upper rotation cap 30 form a ball valve. The lower fixed cap 60 has a periphery provided with a plurality of fixed wings 62 extending outward. The conic lower cap 63 has a surface provided with a plurality of third water outlet holes 61 corresponding to the second water outlet holes 51 of the switch valve 50. The switch valve 50 is rotatable relative to the lower fixed cap 60 to align or misalign the second water outlet holes 51 of the switch valve 50 with the third water outlet holes 61 of the lower fixed cap 60.

Figure 5:
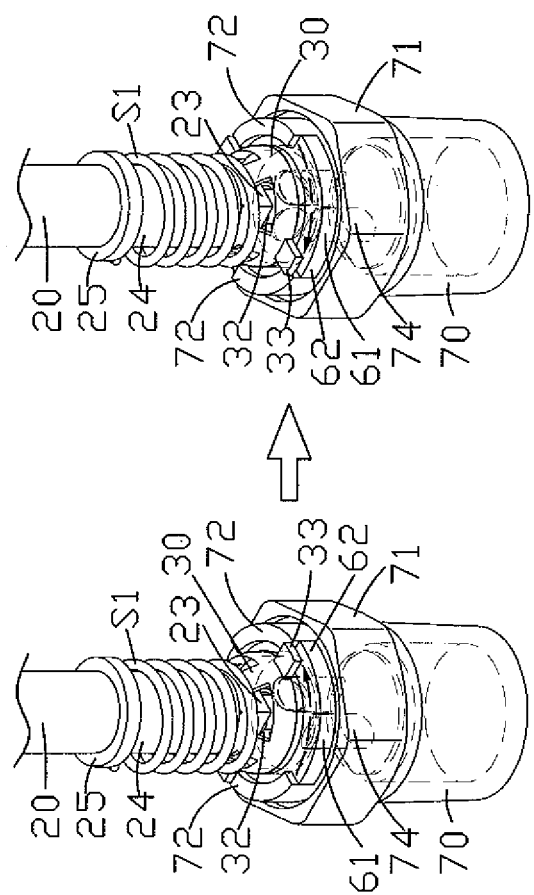
FIG. 5 is a schematic perspective operational view, showing rotation of an upper rotation cap of the hydrant device in accordance with the preferred embodiment of the present invention.

The water intake seat 70 is mounted on a lower end of the faucet body 10. The water intake seat 70 has an interior provided with a plurality of fourth water outlet holes 74 corresponding to the third water outlet holes 61 of the lower fixed cap 60, and provided with a conic cavity 75 for receiving the lower fixed cap 60. The water intake seat 70 has an upper end provided with a hexagonal driving portion 71 which has a top provided with a plurality of positioning protrusions 72 and a plurality of positioning recesses 73 arranged between the positioning protrusions 72. The fixed wings 62 of the lower fixed cap 60 are secured in the positioning recesses 73 of the water intake seat 70. The limit arms 33 of the upper rotation cap 30 are movable in the positioning recesses 73 of the water intake seat 70 and are limited by the positioning protrusions 72 of the water intake seat 70 as shown in FIG. 5.

In the preferred embodiment of the present invention, the upper end of the rotation shaft 20 is provided with an external thread 21 extending and protruding from a center of the rotary knob 11, and a nut "N" is screwed onto the external thread 21 of the rotation shaft 20 to combine the rotary knob 11 with the rotation shaft 20. The connecting head 23 of the rotation shaft 20 has a square shape, and the connecting hole 31 of the upper rotation cap 30 has a square shape. The first water outlet holes 32 of the upper rotation cap 30 has a rectangular shape. The second water outlet holes 51 of the switch valve 50, the third water outlet holes 61 of the lower fixed cap 60 and the fourth water outlet holes 74 of the water intake seat 70 have a circular shape. The lower fixed cap 60 is preferably made of rubber material or Teflon material to provide an excellent water-tight function. The upper rotation cap 30 is preferably made of stainless steel material. The switch valve 50 is preferably made of stainless steel material.

Figure 7:
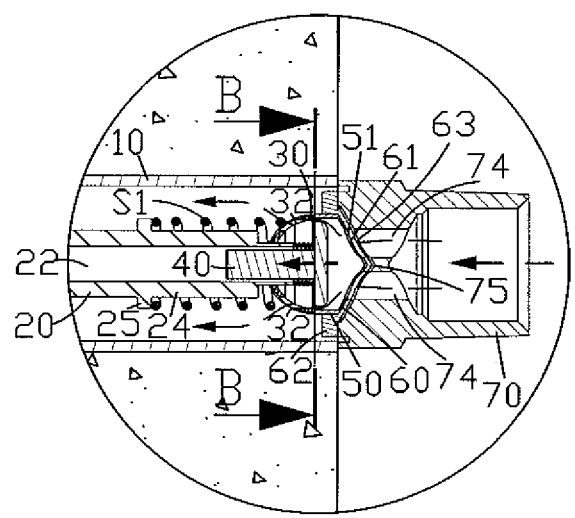
FIG. 7 is a locally enlarged cross-sectional view of the hydrant device as shown in FIG. 6.
Figure 8:
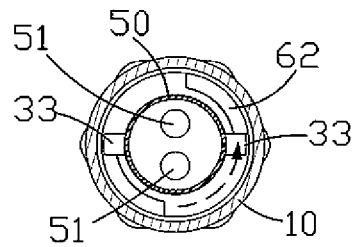
FIG. 8 is a cross-sectional view of the hydrant device taken along line B-B as shown in FIG. 7.

In operation, referring to FIGS. 6-8 with reference to FIGS. 1-5, when the rotary knob 11 of the faucet body 10 is rotated in a first direction (or reverse direction), the rotation shaft 20, the upper rotation cap 30 and the switch valve 50 are rotated simultaneously relative to the lower fixed cap 60 and the water intake seat 70, so that the second water outlet holes 51 of the switch valve 50 are moved to align with the third water outlet holes 61 of the lower fixed cap 60 as shown in FIG. 7. At this time, when the upper rotation cap 30 is rotated relative to the lower fixed cap 60 and the water intake seat 70, the limit arms 33 of the upper rotation cap 30 are moved in the positioning recesses 73 of the water intake seat 70 to abut the positioning protrusions 72 of the water intake seat 70 so as to stop further movement of the upper rotation cap 30, so that rotation of the upper rotation cap 30 is limited. In such a manner, water in turn flows through the fourth water outlet holes 74 of the water intake seat 70, the third water outlet holes 61 of the lower fixed cap 60 and the second water outlet holes 51 of the switch valve 50 into the switch valve 50. Then, the water pushes the stop face 41 of the check valve 40 upward to form a clearance between the stop face 41 of the check valve 40 and the switch valve 50. Then, the water in turn flows through the clearance between the stop face 41 of the check valve 40 and the switch valve 50, the first water outlet holes 32 of the upper rotation cap 30 and the interior of the faucet body 10 and flows outward from one of the two water outlet connectors 12 as shown in FIG. 6.

Figure 9:
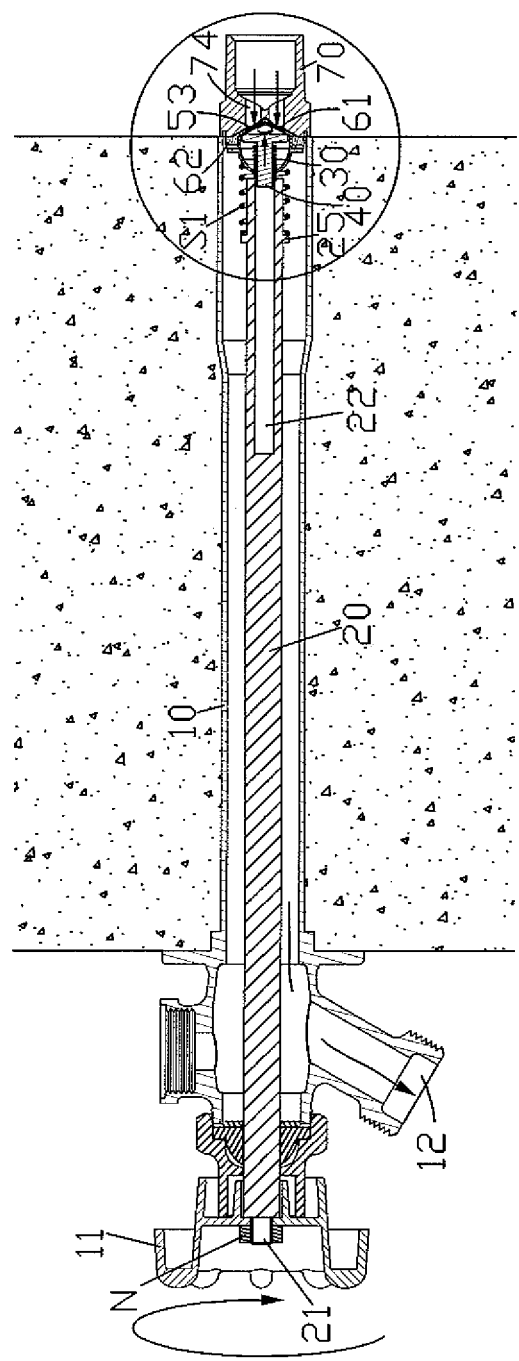
FIG. 9 is a cross-sectional operational view, showing the hydrant device being disposed at a closed state.
Figure 10:
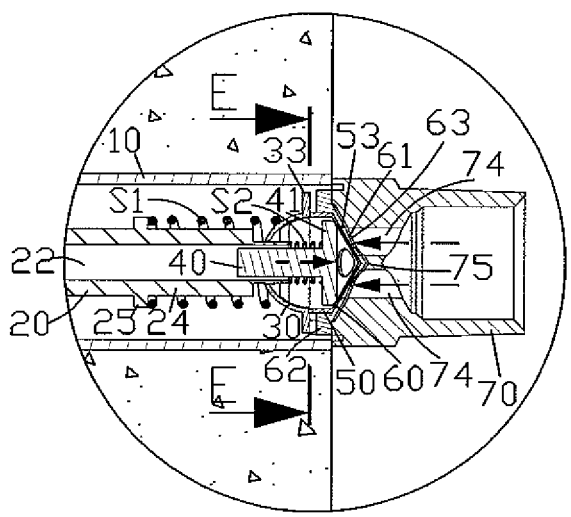
FIG. 10 is a locally enlarged cross-sectional view of the hydrant device as shown in FIG. 9.
Figure 11:
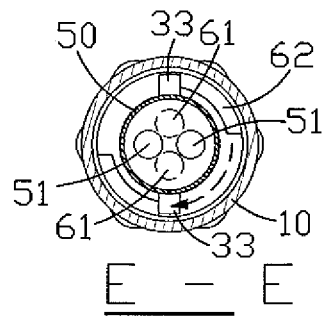
FIG. 11 is a cross-sectional view of the hydrant device taken along line E-E as shown in FIG. 10.

On the contrary, referring to FIGS. 9-11 with reference to FIGS. 1-5, when the rotary knob 11 of the faucet body 10 is rotated in a second direction (or normal direction) that is opposite to the first direction, the rotation shaft 20, the upper rotation cap 30 and the switch valve 50 are rotated simultaneously relative to the lower fixed cap 60 and the water intake seat 70, so that the second water outlet holes 51 of the switch valve 50 are moved to misalign with the third water outlet holes 61 of the lower fixed cap 60 as shown in FIG. 10. At this time, when the upper rotation cap 30 is rotated relative to the lower fixed cap 60 and the water intake seat 70, the limit arms 33 of the upper rotation cap 30 are moved in the positioning recesses 73 of the water intake seat 70 to abut the positioning protrusions 72 of the water intake seat 70 so as to stop further movement of the upper rotation cap 30, so that the rotation of the upper rotation cap 30 is limited. In such a manner, the third water outlet holes 61 of the lower fixed cap 60 are closed by the peripheral wall of the switch valve 50 to form a closed state, so that the water from the fourth water outlet holes 74 of the water intake seat 70 and the third water outlet holes 61 of the lower fixed cap 60 cannot enter the second water outlet holes 51 of the switch valve 50, and the water flow is stopped. At the same time, the stop face 41 of the check valve 40 is pushed backward by the restoring force of the second elastic member "S2", so that the stop face 41 of the check valve 40 is moved to seal the switch valve 50, thereby preventing the water from being gathered in the switch valve 50.

Accordingly, the stop face 41 of the check valve 40 forms an anti-reverse state to seal the switch valve 50, thereby preventing the water from being gathered in the switch valve 50. In addition, the stop face 41 of the check valve 40 prevents the water from being collected in the switch valve 50, so that the switch valve 50 will not be swollen or broken during the winter when the water freezes. Further, the stop face 41 of the check valve 40 prevents the water from being accumulated in the switch valve 50, thereby preventing from growth of bacteria, and thereby preventing from causing a pollution.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A hydrant device comprising:
   a faucet body, a rotation shaft, an upper rotation cap, a first elastic member, a second elastic member, a check valve, a switch valve, a lower fixed cap, and a water intake seat;
   wherein:
   the faucet body has an upper end provided with a rotary knob and two water outlet connectors;
   the faucet body has an interior which receives the rotation shaft, the first elastic member, the upper rotation cap, the second elastic member, the check valve, the switch valve and the lower fixed cap;
   the rotation shaft extends through the faucet body and has an upper end affixed to the rotary knob to rotate in concert with the rotary knob;
   the rotation shaft has a lower end provided with an axial hole, a connecting head, a mounting portion and a flange;
   the upper rotation cap is mounted on the rotation shaft to rotate in concert with the rotation shaft;
   the upper rotation cap has a central portion provided with a connecting hole mounted on the connecting head of the rotation shaft;
   the upper rotation cap has a surface provided with a plurality of first water outlet holes;
   the upper rotation cap has a periphery provided with a plurality of limit arms;
   the upper rotation cap has a bottom provided with a plurality of inserts;
   the first elastic member is mounted on the mounting portion of the rotation shaft and is biased between the flange of the rotation shaft and the upper rotation cap;
   the second elastic member is received in the upper rotation cap and is biased between the upper rotation cap and the check valve;
   the check valve extends through the second elastic member and extends into the axial hole of the rotation shaft;
   the check valve has a lower end provided with a stop face;
   the switch valve is combined with the upper rotation cap to rotate in concert with the upper rotation cap;
   the switch valve has a conic upper cap having a surface provided with a plurality of second water outlet holes located under the stop face of the check valve;
   the switch valve has a top provided with a plurality of slots mounted on the inserts of the upper rotation cap;
   the lower fixed cap has an interior receiving the switch valve;
   the lower fixed cap has a periphery provided with a plurality of fixed wings;
   the lower fixed cap has a conic lower cap having a surface provided with a plurality of third water outlet holes corresponding to the second water outlet holes of the switch valve;
   the conic lower cap and the upper rotation cap form a ball valve;
   the switch valve is rotatable relative to the lower fixed cap to align or misalign the second water outlet holes of the switch valve with the third water outlet holes of the lower fixed cap;
   the water intake seat is mounted on a lower end of the faucet body;
   the water intake seat has an interior provided with a plurality of fourth water outlet holes corresponding to the third water outlet holes of the lower fixed cap, and provided with a cavity for receiving the lower fixed cap;
   the water intake seat has an upper end provided with a driving portion which has a top provided with a plurality of positioning protrusions and a plurality of positioning recesses arranged between the positioning protrusions;
   the fixed wings of the lower fixed cap are secured in the positioning recesses of the water intake seat; and
   the limit arms of the upper rotation cap are movable in the positioning recesses of the water intake seat and are limited by the positioning protrusions of the water intake seat.

2. The hydrant device of claim 1, wherein an upper end of the rotation shaft is provided with an external thread extending and protruding from a center of the rotary knob, and a nut is screwed onto the external thread of the rotation shaft to combine the rotary knob with the rotation shaft.

3. The hydrant device of claim 1, wherein the connecting head of the rotation shaft has a square shape, and the connecting hole of the upper rotation cap has a square shape.

4. The hydrant device of claim 1, wherein the first water outlet holes of the upper rotation cap has a rectangular shape.

5. The hydrant device of claim 1, wherein the second water outlet holes of the switch valve, the third water outlet holes of the lower fixed cap and the fourth water outlet holes of the water intake seat have a circular shape.

6. The hydrant device of claim 1, wherein the lower fixed cap is made of rubber material.

7. The hydrant device of claim 1, wherein the lower fixed cap is made of Teflon material.

8. The hydrant device of claim 1, wherein the upper rotation cap is made of stainless steel material.

9. The hydrant device of claim 1, wherein the switch valve is made of stainless steel material.

\* \* \* \* \*